United States Patent [19]

Chu

[11] Patent Number: 5,169,218
[45] Date of Patent: Dec. 8, 1992

[54] COMPUTER MAINFRAME FRONT PANEL ASSEMBLY

[76] Inventor: Edward Chu, 2F., No. 10, Lane 329, Sec. 1, Tunhua S. Rd., Taipei, Taiwan

[21] Appl. No.: 785,587

[22] Filed: Oct. 30, 1991

[51] Int. Cl.⁵ ............................................ A47B 96/00
[52] U.S. Cl. .............................. 312/223.2; 312/306; 312/319.2
[58] Field of Search ...................... 312/319, 330.1, 306, 312/223

[56] References Cited

U.S. PATENT DOCUMENTS 4,804,238  2/1989  Bischof et al. .................. 312/319 X Primary Examiner—Peter R. Brown
Attorney, Agent, or Firm—Varndell Legal Group

[57] ABSTRACT

A computer mainframe front panel assembly, comprising a front panel which has a hole on a sloping top edge and a diskdrive slot on a vertical front wall, swivel control panel fastened in the hole on said sloping top edge and pivoted to a framework for a computer mainframe, and a lift gate moved to close or open said diskdrive slot. The lift gate comprises a frame attached to the front panel at the back to hold a cover plate which is maintained at any of various level positions by alternatively engaging a plurality of spring pawls on said cover plate into a plurality of recesses on said frame. Power switch is switched on when the control panel is moved to an opened position, or switched off when the control panel is moved to a closed position to block up the hole on the sloping top edge of the front panel.

2 Claims, 6 Drawing Sheets

COMPUTER MAINFRAME FRONT PANEL ASSEMBLY

BACKGROUND OF THE INVENTION

The present invention relates to a computer mainframe front panel assembly and relates more particularly to such a computer mainframe front panel assembly for a vertical computer mainframe, which has a lift gate and a control panel respectively moved to block up the diskdrive slot and the hole for control panel on the front panel thereof.

Today, computer has been commonly used by people in offices as well as at home to collect, store and process any of a variety of data. On the front panel of a vertical computer mainframe, there is provided a slot for fastening a diskdrive, and a control panel consisted of Power, Turbo, Reset, LED and Key Work for operational control or indication. Because the control panel and the slot for diskdrive are generally exposed to the air, dust and moisture in the air or dirts on users' fingers may be gathered in the gaps on the front panel causing electric contact error. It is not an easy job to remove dirts from the gaps on a computer mainframe front panel. Further, because the control panel of a computer mainframe front panel is uncovered, an operator may touch the Reset or Power switch by mistake during data input operation. Once the Reset or Power switch is touched, inputted key codes are completely cleared from the disk. Although there is known a swivel cover fastened in a computer mainframe front panel for protecting a diskdrive slot against dust and moisture, this known structure of swivel cover is still not satisfactory in use. Because a space out of the computer mainframe shall be provided for the movement of the swivel cover, the computer mainframe must be spaced from wall at a certain distance. Because the swivel cover projects out of the computer mainframe when it is opened, it may be damaged easily while one is passing thereby. Further, this swivel cover may displace from its open position to block up the slot for diskdrive again.

SUMMARY OF THE INVENTION

The present invention has been accomplished to eliminate the aforesaid problems and disadvantages. It is therefore the main object of the present invention to provide a front panel assembly for a computer mainframe which has means moved to effectively protect a computer mainframe against dust and moisture, when a computer mainframe is not in operation. It is another object of the present invention to provide a front panel assembly for a computer mainframe which does not occupy additional outside space.

According to one aspect of the present invention, a front panel assembly for a computer mainframe is generally comprised of a lift gate fastened in a front panel and moved to close or open a diskdrive slot. The lift gate comprises a sliding cover plate movably secured to the front panel by a frame. The frame has a plurality of spaced recessed on two opposite angle rails for engaging a plurality of spaced spring pawls on the cover plate, and therefore, the cover plate can be moved up and down and retained at any of various level positions. According to another aspect of the present invention, the front panel assembly has a hole on a sloping top edge for fastening a control panel which has an operational surface and a flat surface. The operational surface is exposed to the hole on the sloping top edge when the control panel is rotated to an opened position; the flat surface is blocked in the hole on the sloping top edge when the control panel is rotated to a closed position. Raised portions are made on the control panel at two opposite sides and alternatively engaged in two opposite pairs of locating holes on a framework permitting the control panel to be firmly retained at the opened or closed position.

DETAILED DESCRIPTION OF THE PREFERRED EMBODIMENT

Figure 1:
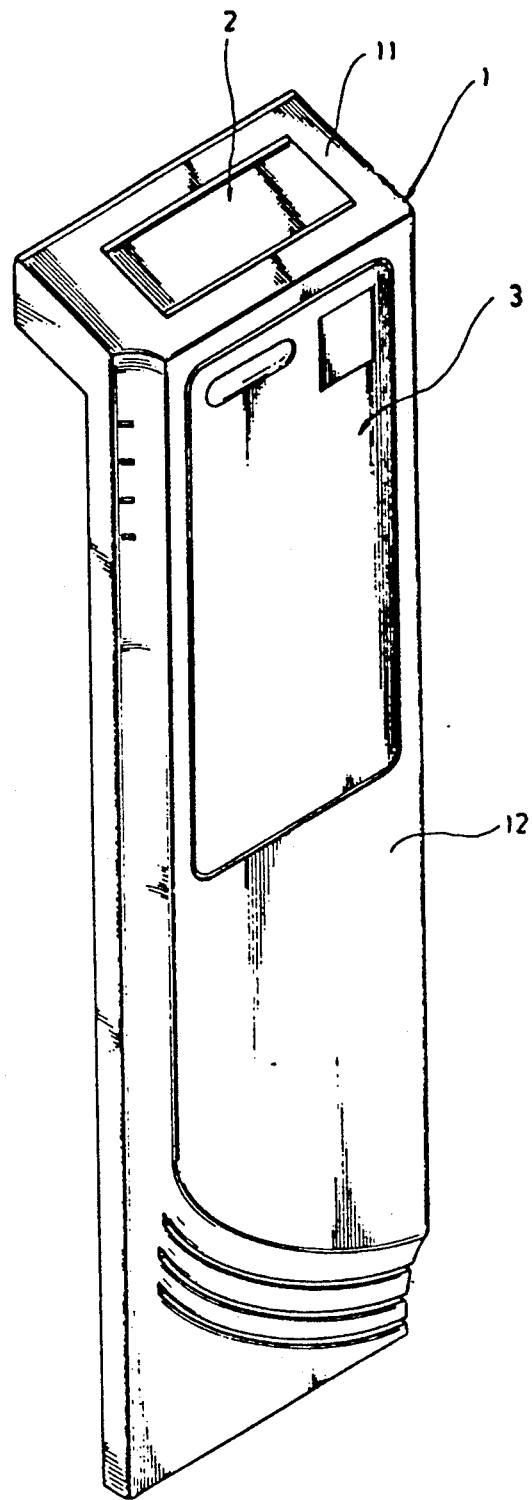
FIG. 1 is a perspective view of a front panel for a vertical computer mainframe embodying the present invention in which the diskdrive slot and the hole for the control panel are closed.
Figure 2:
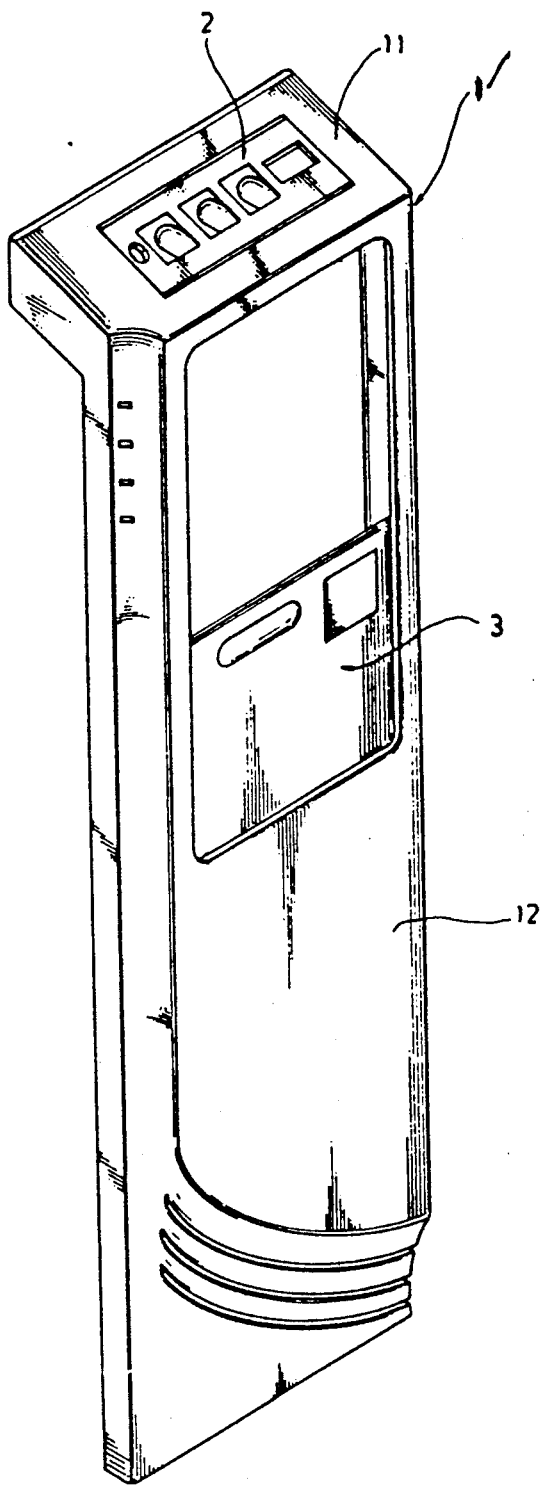
FIG. 2 is another perspective view of the front panel of FIG. 1, in which the diskdrive slot and the hole for the control panel are closed.

Referring to FIGS. 1 and 2, a vertical computer frame front panel 1 has a sloping top edge 11 in which a control panel assembly 2 is fastened, and a vertical front wall 12 in which a lift gate 3 is made.

Figure 3:
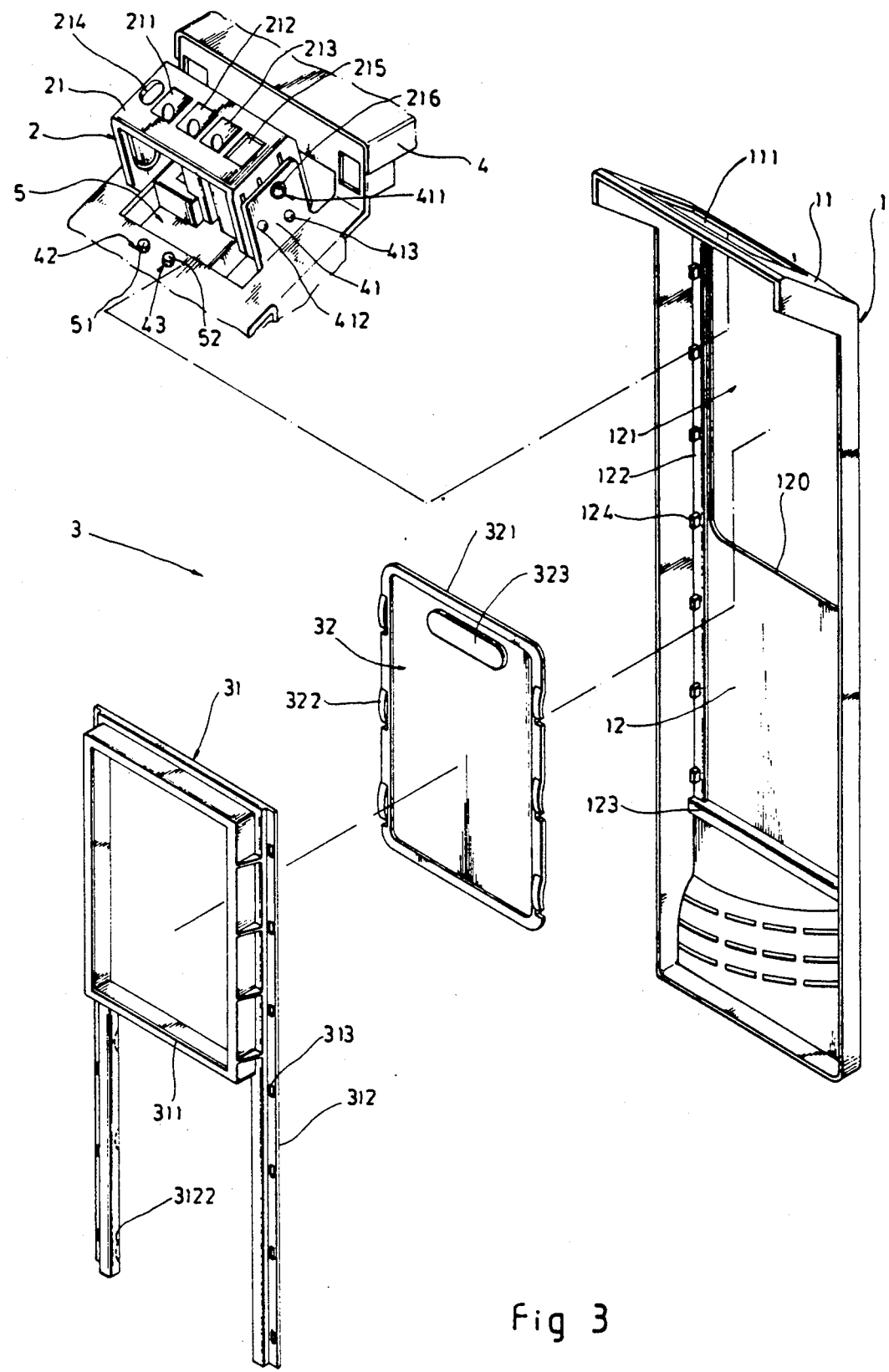
FIG. 3 is an exploded perspective view of the lift gate.

Referring to FIG. 3, the front panel 1 has a rectangular diskdrive slot 121 on the vertical front wall 12 adjacent to the sloping top edge 11 thereof for mounting a lift gate 3 which is comprised of a frame 31 and a cover plate 32. The front panel 1 further comprises two parallel rails 122 vertically disposed on the inner wall surface thereof along the peripheral edge of the diskdrive slot 121 at two opposite sides, and a transverse rail 123 connected between said two parallel rails 122 at the bottom. The parallel rails 122 are twice the height of the diskdrive slot 121, each of which having a plurality of spaced blocks 124. The cover plate 32 which is made in size approximately equal to the diskdrive slot 121 has tapered top and bottom edges 321 fitting the tapered top and bottom edge 120 on the diskdrive slot 121, a plurality of spring pawls 322 equidistantly spaced from one another on the back wall surface thereof at two opposite sides, and an elongated slot 323 transversely disposed at an upper location. The frame 31 comprises two angle rails 312 longitudinally disposed at two opposite sides, and a framed wall 311 between said two angle rails 312 at the top, wherein said angle rails 312 are made in length equal to the two parallel rails 122 on the front panel 1 and each of which has a plurality of retaining holes 313 in size and locations corresponding to the blocks 124 on the parallel rails 122; said framed wall 311 is made in size fitting the cover plate 32. By engaging the blocks 124 on the parallel rails 124 into the retaining holes 313 on the angle rails 312, the frame 31 is secured to the front panel 1 to hold the cover plate 32 therebetween.

Figure 4:
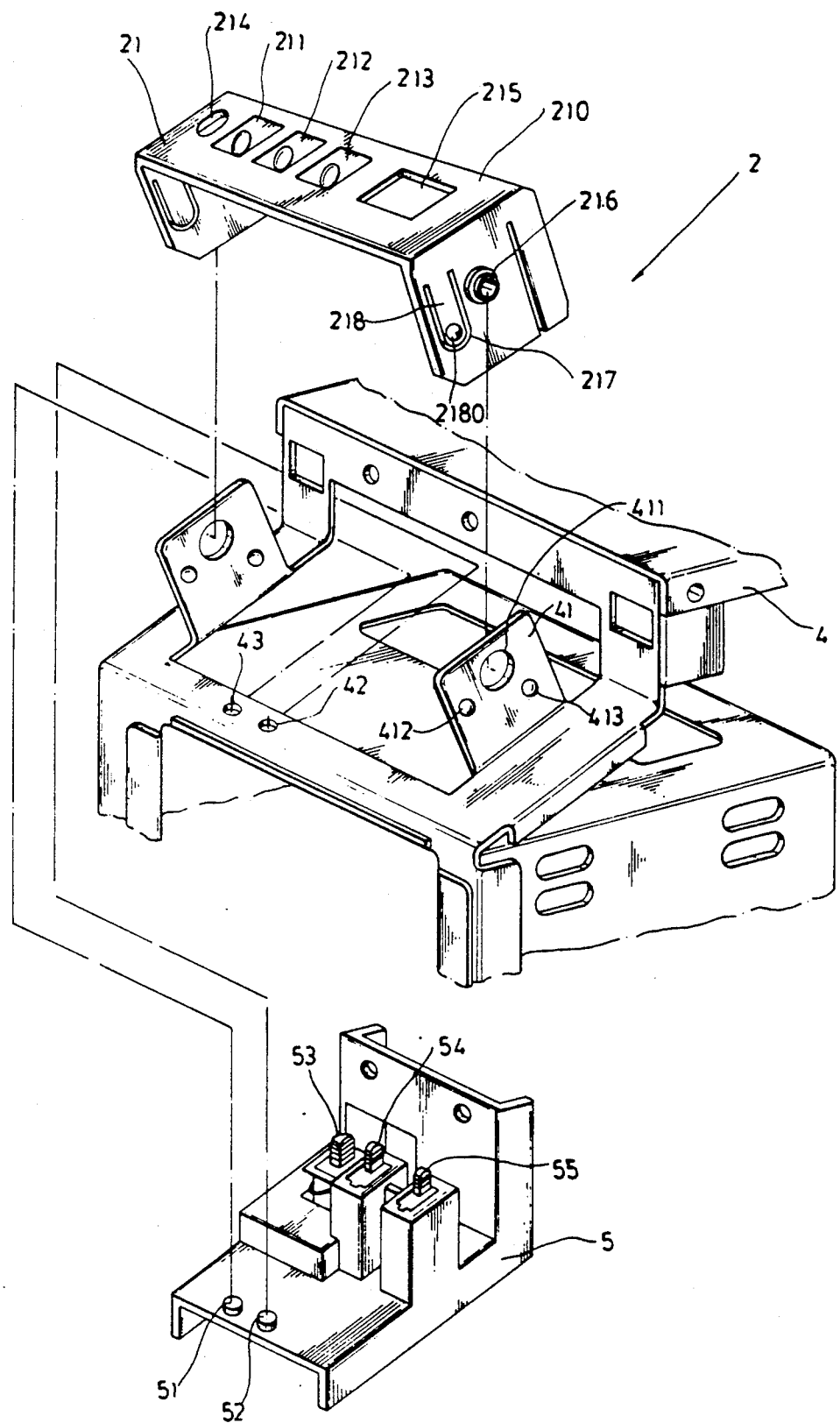
FIG. 4 is an exploded perspective view of the control panel assembly.

Referring to FIG. 4 and seeing FIG. 3 again, the control panel assembly 2 comprises control panel 21 pivoted to the framework 4 of a computer mainframe above a power supply holder 5. The control panel 21 is made in a substantially U-shaped structure having a key hole 214, three control keys 211, 212, 213 and a LED slot 215 on the top edge 210 thereof. The control panel 21 further comprises one pair of pivots 216, one pair of U-shaped grooves 217, one pair of U-shaped spring leaves 218, and one pair of raised portions 2180 symmetrically made on the two opposite side walls thereof, wherein said pair of U-shaped spring leaves 218 are formed through the process of punching during the formation of the U-shaped grooves 217. The framework 4 has two lugs 41 at two opposite locations each of which having a mounting hole 411 for inserting either pivot 216 and two locating holes 412, 413 for alternatively engaging either raised portion 2180, wherein said two locating holes 412, 413 are spaced from each other through a 90° angle relative to the mounting hole. By engaging the two raised portions 2180 in either locating hole 412, 413 on each lug 41, the control panel 21 is maintained at either closed or opened position. The power supply holder 5 has three control switches 53, 54, 55 corresponding to the three control keys 211, 212, 213 on the control panel 21, and two raised portions 51, 52 corresponding two fastening holes 42, 43 on the framework 4. By engaging the raised portions 51, 52 into the fastening holes 42, 43, the power supply holder 5 is secured to the framwork 4. When the control panel 21 is rotated outwards into an opened position, the control keys 211, 212, 213 are simultaneously moved to press on the control switches 53, 54, 55, and therefore, the control switches 53, 54, 55 are switched on when the control panel 21 is rotated into an opened position. When the control panel 21 is moved back to its original closed position, the control keys 211, 212, 213 are released from the control switches 53, 54, 55, and therefore, the control switches 53, 54, 55 are switched off when the control panel 21 is rotated into a closed position.

Figure 5:
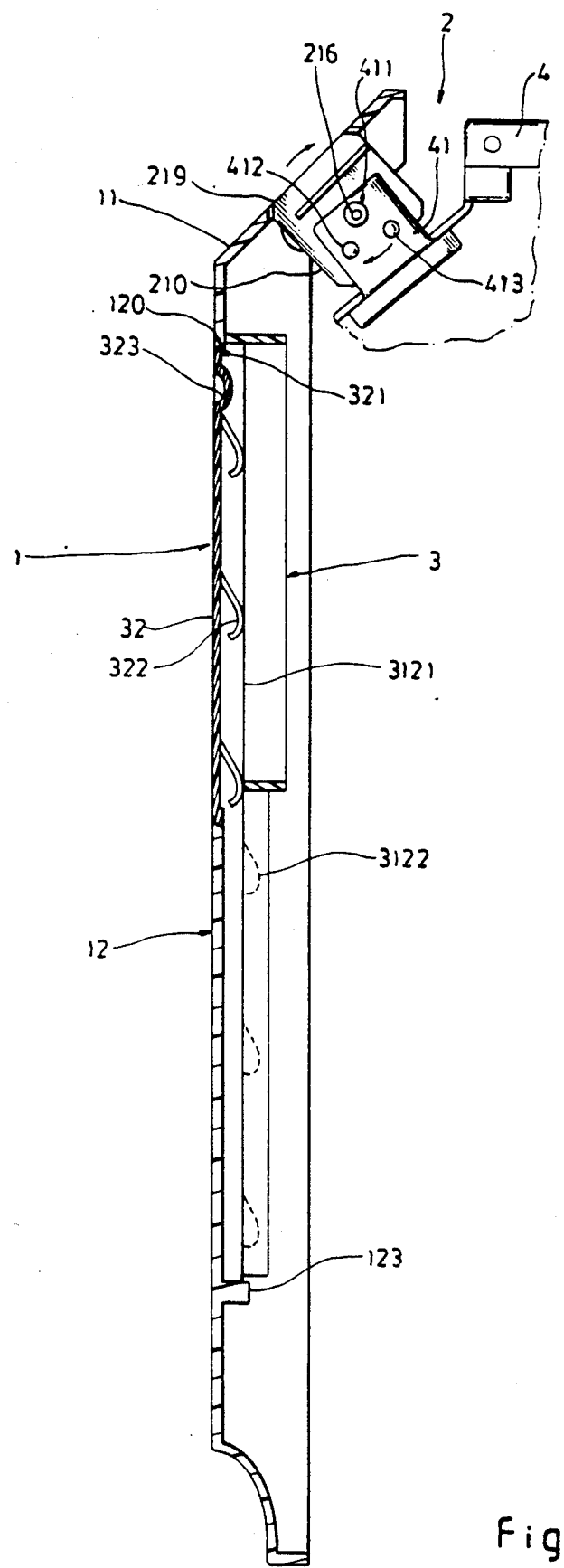
FIG. 5 is a sectional side view showing the control panel and the cover plate are respectively set in closed positions.
Figure 6:
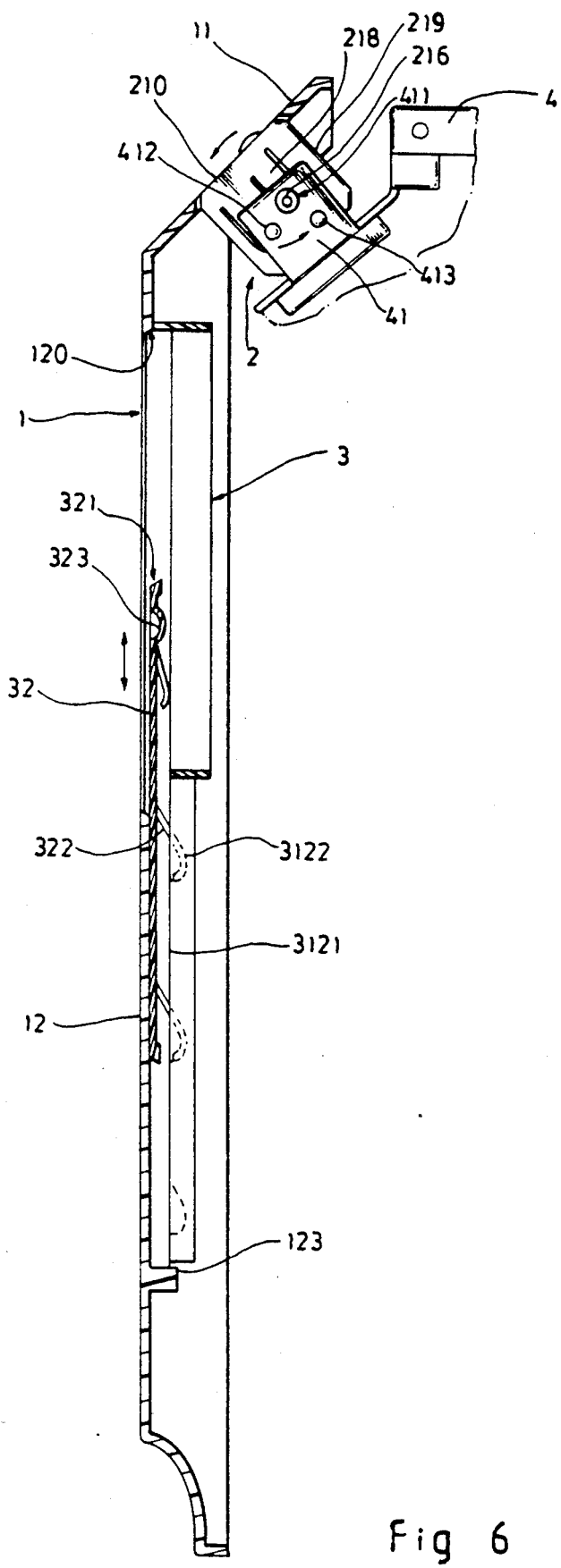
FIG. 6 is another sectional side view of the present invention showing that the control panel and the cover plate are respectively set in opened positions.

Referring to FIGS. 5 and 6, the spring pawls 322 on the cover plate 32 of the lift gate 3 are stopped against the edges 3121 on the angle rails 312 causing the tapered top and bottom edges 321 of the cover plate 32 to be respectively tightly engaged with the tapered top and bottom edges 120 of the diskdrive slot 121, and therefore, the cover plate 32 completely covers the diskdrive slot 121. The two angle rails 312 of the lift gate 3 further comprise a plurality of spaced recesses 3122 corresponding to the spring pawls 322 on the cover plate 32. When a pressure is applied at the cover plate 32 to squeeze the spring pawls 322, the cover plate 32 is disengaged from the diskdrive slot 121, and therefore, the cover plate 32 can be moved in longitudinal direction within the two parallel rails 122 and the two angle rails 312. The elongated slot 323 on the cover plate 32 is provided for the holding of the fingers in moving the cover plate 32. By alternatively engaging the spring pawls 322 in the spaced recesses 3122, the cover plate 32 can be firmly retained in any of various level positions. Once the cover plate 32 is moved to a lower limit position stopped at the transverse rail 123, the diskdrive slot 121 is completely opened.

Referring to FIG. 6 again, when the two raised portions 2180 on the two U-shaped spring leaves 218 of the control panel 21 are respectively engaged into the locating holes 412, the operational face, namely the top edge 210 of the control panel 21 is exposed to the outside through a hole 111 on the sloping top edge 11 of the front panel 1. Once the control panel 21 is rotated back to its original position with the two raised portions 2180 on the two U-shaped spring leaves 210 respectively engaged into the locating holes 413, a flat surface (not shown) on the control panel 21 is blocked in the hole 111. Therefore, by rotating the control panel 21, the hole 111 on the sloping top edge 11 of the front panel 1 can be alternatively opened or closed.

I claim:

1. A computer mainframe front panel assembly comprising a front panel having a sloping top edge and a vertical front wall, said sloping top edge having a hole for fastening a control panel assembly, said vertical front wall having a diskdrive slot covered by a lift gate, and characterized in that:

said front panel comprises two parallel rails longitudinally disposed on the inner wall surface thereof along the peripheral edge of said diskdrive slot at two opposite sides, and a transverse rail connected between said two parallel rails at the bottom, said two parallel rails each having a plurality of spaced blocks;

said lift gate comprises a frame secured to said two parallel rails and a cover plate moved to cover or open said diskdrive slot, said cover plate having a plurality of spring pawls alternatively equidistantly spaced from one another on the back wall surface thereof at two opposite sides, and an elongated slot transversely disposed at an upper location to provide a means for grasping, said frame comprising two angle rails longitudinally disposed at two opposite sides and a framed wall aligned with said diskdrive slot, said two angle rails each having a plurality of retaining holes for engaging said blocks on said two parallel rails and a plurality of spaced recesses for engaging said spring pawls on said cover plate; and said control panel assembly comprises a control panel pivoted to two lugs on a framework for a computer mainframe and disposed above a power supply holder, said control panel comprising an operational surface, a flat surface extending from said operational surface at one side at a right angle, and two opposite side walls extending from said operational surface at two opposite ends at right angles, said two opposite side walls each having a pivot and a raised portion on a spring leaf, said lugs each having a pivot hole respectively receiving said pivots and two locating holes spaced 90° from each other relative to said pivot hole for receiving said raised portion permitting said control panel to be alternatively disposed in an opened position with said operation surface exposed to the hole on said sloping top edge or in a closed position with said flat surface blocked in the hole on said sloping top edge.

2. The computer mainframe front panel assembly of claim 1, wherein said operational surface on said control panel has a control key moved to switch on a power switch on said power supply holder when said control panel is moved to said opened position, or to switch off said power switch when said control panel is moved to said closed position where access to said power switch is prevented.

* * * * *